(12) United States Patent
Hoberman

(10) Patent No.: US 11,645,046 B2
(45) Date of Patent: May 9, 2023

(54) SYSTEMS AND METHODS FOR DEVELOPMENT AND DEPLOYMENT OF SOFTWARE PLATFORMS HAVING ADVANCED WORKFLOW AND EVENT PROCESSING COMPONENTS

(71) Applicant: Unqork, Inc, New York, NY (US)

(72) Inventor: Gary Hoberman, Syosset, NY (US)

(73) Assignee: Unqork, Inc., New York, NY (US)

( * ) Notice: Subject to any disclaimer, the term of this patent is extended or adjusted under 35 U.S.C. 154(b) by 0 days.

(21) Appl. No.: 16/025,643

(22) Filed: Jul. 2, 2018

(65) Prior Publication Data
US 2019/0004773 A1 Jan. 3, 2019

Related U.S. Application Data

(60) Provisional application No. 62/528,317, filed on Jul. 3, 2017.

(51) Int. Cl.
*G06F 8/34* (2018.01)
*G06F 3/0486* (2013.01)
(Continued)

(52) U.S. Cl.
CPC ............ *G06F 8/34* (2013.01); *G06F 3/0482* (2013.01); *G06F 3/0486* (2013.01);
(Continued)

(58) Field of Classification Search
CPC ........ G06F 16/957; G06F 16/972; G06F 8/34; G06F 16/22
See application file for complete search history.

(56) References Cited

U.S. PATENT DOCUMENTS 6,748,425 B1 * 6/2004 Duffy .................... G06Q 10/10
709/219
7,340,721 B1 * 3/2008 Bailey ....................... G06F 8/38
717/109
(Continued)

FOREIGN PATENT DOCUMENTS

EP 2913763 A1 2/2015

OTHER PUBLICATIONS

Business Rules service introduced Decision Composer, Mar. 21, 2017, [retrieved Jul. 11, 2018]. Retrieved from the Internet <URL:https://www.ibm.com/blogs/bluemix/2017/03/business-rules-service-introduces-decision-composer/>.
(Continued)

*Primary Examiner* — Lewis A Bullock, Jr.
*Assistant Examiner* — Theodore E Hebert
(74) *Attorney, Agent, or Firm* — Occhiuti & Rohlicek LLP

(57) ABSTRACT

This disclosure relates to an improved software development platform that enables the dynamic generation and deployment of advanced electronic forms. The platform includes graphical user interfaces that enable users to drag-and-drop or otherwise insert components into a development window to define the content, functionality, workflow, background processes, and other criteria for the electronic forms. The components may correspond to pre-defined or pre-packaged software bundles that can be integrated into the electronic forms to define input fields, design layouts, application functions, preconfigured templates, and background processes. After electronic forms are completed, options can be selected to deploy the forms in a cloud-based environment or in other ways.

24 Claims, 12 Drawing Sheets

(51) Int. Cl.
  *G06F 3/04847* (2022.01)
  *G06F 3/0482* (2013.01)
  *G06N 20/00* (2019.01)
  *G06F 16/22* (2019.01)
  *G06F 8/38* (2018.01)
  *G06F 40/174* (2020.01)

(52) U.S. Cl.
  CPC ............ *G06F 3/04847* (2013.01); *G06F 8/38* (2013.01); *G06F 16/22* (2019.01); *G06F 40/174* (2020.01); *G06N 20/00* (2019.01)

(56) References Cited

U.S. PATENT DOCUMENTS

| | | | | |
|---|---|---|---|---|
| 7,712,022 | B2* | 5/2010 | Smuga | G06F 40/174 715/224 |
| 8,479,109 | B2* | 7/2013 | Washington | G06F 8/34 717/105 |
| 8,683,315 | B2* | 3/2014 | Stover | G06F 3/0482 715/222 |
| 8,898,629 | B2* | 11/2014 | Hirsch | G06F 8/36 717/107 |
| 9,329,838 | B2* | 5/2016 | Tattrie | G06F 8/34 |
| 9,710,456 | B1* | 7/2017 | Mengle | G06F 40/295 |
| 9,851,953 | B2* | 12/2017 | Straub | G06F 8/20 |
| 10,048,946 | B2* | 8/2018 | Krishnan | G06F 8/35 |
| 10,185,703 | B2* | 1/2019 | Abrahami | G06F 40/103 |
| 2005/0065933 | A1* | 3/2005 | Goering | G06F 16/958 707/999.009 |
| 2005/0066287 | A1* | 3/2005 | Tattrie | G06F 8/34 715/769 |
| 2006/0150148 | A1* | 7/2006 | Beckett | G06F 8/34 717/109 |
| 2007/0240080 | A1* | 10/2007 | Eldridge | G06F 8/34 717/113 |
| 2007/0250769 | A1* | 10/2007 | Bass | G06F 40/174 715/234 |
| 2008/0120538 | A1* | 5/2008 | Kurz | G06F 16/972 715/255 |
| 2008/0307385 | A1* | 12/2008 | Dreiling | G06F 3/0481 717/108 |
| 2010/0325601 | A1* | 12/2010 | Turner | G06F 9/451 717/121 |
| 2011/0041069 | A1* | 2/2011 | Carletti | G06F 8/34 715/738 |
| 2011/0161912 | A1* | 6/2011 | Eteminan | G06F 8/34 717/124 |
| 2012/0260232 | A1* | 10/2012 | Hirsch | G06F 8/30 717/107 |
| 2013/0097478 | A1* | 4/2013 | Allison | G06Q 10/10 715/222 |
| 2014/0277743 | A1* | 9/2014 | Hart | B25J 9/1661 700/264 |
| 2015/0242093 | A1* | 8/2015 | Yost | G06F 3/04817 715/763 |
| 2016/0378439 | A1* | 12/2016 | Straub | G06F 8/61 717/107 |
| 2017/0011308 | A1* | 1/2017 | Sun | G06F 11/00 |
| 2017/0083292 | A1* | 3/2017 | McLaughlan | G06F 3/0484 |
| 2017/0147190 | A1* | 5/2017 | Twist | G06F 3/0481 |
| 2017/0236067 | A1* | 8/2017 | Tjiong | G06F 3/048 706/11 |
| 2017/0242574 | A1* | 8/2017 | Wallington | G06F 3/04847 |
| 2017/0262568 | A1* | 9/2017 | Sakurai | G06F 8/34 |
| 2017/0329786 | A1* | 11/2017 | Chow | G06F 3/04817 |
| 2017/0337171 | A1* | 11/2017 | Ito | G06F 40/174 |
| 2018/0181378 | A1* | 6/2018 | Bakman | G06F 8/38 |

OTHER PUBLICATIONS

Serverless Form-based Applications [retrieved Jul. 11, 2018]. Retrieved from the Internet <URL:https://form.io/#/>.
Form Builder [retrieved Jul. 11, 2018]. Retrieved from the Internet <URL:http://www.salesforceforms.com/features/form-builder>.
Cardone et al., "Using XForms to Simplify Web Programming," p. 215-224, published on May 14, 2005.†
Ito et al., "A Visual Environment for Dynamic Web Application Composition," 10 pages, published on Aug. 30, 2003.†
"Upgrade to SPSS Data Entry 2.0 Makes Designing Surveys, Data Collection Easier; Software Helps Business Collect Attitude and Opinion Data to Improve Customer Relationships," Business Wire, Published on Jun. 19, 2000, 6 pages.†
Aghaee et al., "Natural End-User Development of Web Mashups," 8 pages, Proceedings of IEEE Symposium on Visual Languages and Human-Centric Computing, published Sep. 19, 2013.†
Aanensen et al., "EpiCollect+: linking smartphones to web applications for complex data collection projects," 23 pages, published Aug. 20, 2014.†

\* cited by examiner
† cited by third party

Single Checkbox Component      500    ×

Display    Error Messages

Label ⓘ
Field Label

Property Name ⓘ
checkeboxField

Input Type ⓘ
Checkbox ▽

Custom CCS Class ⓘ
Custom CCS Class

Description ⓘ
Description for this field.

☐ Multiple Values ⓘ
☑ Clear Value When Hidden ⓘ
☐ Protected ⓘ
☑ Persistent ⓘ
☑ Datagrid Label ⓘ

☐ Hidden ⓘ
☐ Disabled ⓘ
☑ Table View ⓘ
☐ Required ⓘ

Field Tags ⓘ

Add a tag

[ SAVE ]          [ SAVE AS TEMPLATE ]

FIG. 5

Date Input Component 700 ✕

Display   Error Messages

Label ⓘ

Field Label

Placeholder ⓘ

Placeholder

☐ Disable user input ⓘ

Restrict Date To Past/Future

None ▽

Trigger ⓘ

Property Name ⓘ dateinput2

Format ⓘ m for month, d for day, y or Y for year

☐ Disable date picker ⓘ

Number of years (+/-) from the current date to show in year dropdown ⓘ

Defaults to 10 (+-10 years)

Delimiter ⓘ

Defaults to /

Field Tags ⓘ

Add a tag

☐ Disabled ⓘ
☐ Required ⓘ

SAVE                                                SAVE AS TEMPLATE

FIG. 7

| Decisions Component | | 800 | ✕ |
|---|---|---|---|

Micro Decision

| Label ⓘ | Property Name ⓘ | Property Type ⓘ |
|---|---|---|
| Decision Name | decisionField | First |
| Trigger Type ⓘ | Debounce Setting ⓘ | |
| Watch ▾ | m for month, d for day, y or Y for year | |

Inputs

| 810 id | type | requ | silen |
|---|---|---|---|
| type | exact | ☐ | ☐ |
| isUnique | exact | ☐ | ☐ |
| | | ☐ | ☐ |
| | | ☐ | ☐ |

Outputs

| 820 id | type |
|---|---|
| canPatent | value |
| canPatent | requiredAndVisible |

Micro Decisions 830

| | type | isUnique | marketSize_min | marketSize_max | canPatent_value | canPatent_requiredAndVisible |
|---|---|---|---|---|---|---|
| 1 | Technology | yes | 0 | 1000 | no | yes |
| 2 | Technology | yes | 1001 | | yes | yes |
| 3 | Biotech | yes | | | yes | yes |
| 4 | | | | | no | no |
| 5 | | | | | | |
| 6 | | | | | | |
| 7 | | | | | | |

Test Harness 840            [EXECUTE]

| | type | isUnique | marketSize | canPatent_value | canPatent_value_result | canPatent_requireAndVisible | canPatent_requireAndVisible_result |
|---|---|---|---|---|---|---|---|
| 1 | Technology | yes | 500 | no | no | yes | yes |
| 2 | Technology | yes | 5000 | yes | yes | yes | yes |
| 3 | | | | | | | |
| 4 | | | | | | | |
| 5 | | | | | | | |

☐ Disabled ⓘ            ☐ Prevent execution while loading data ⓘ
☐ Persistent ⓘ          ☐ Prevent navigation until complete ⓘ
Field Tags ⓘ            ☐ Allow dot notation in names ⓘ
Add a tag

[SAVE] [CANCEL]                                      [SAVE AS TEMPLATE]

Data Workflow Component
Data Workflow Options
Label ⓘ
Data Workflow Name                    Property Name ⓘ                    900A
                                      workflowField I/O
| Input |
| Output |
| Console |

930

Info

910

Frequently Used
| Table |
| Object |
| Value |

Trigger Type ⓘ                    ☐ Disabled ⓘ    ☐ Debug ⓘ         SHOW TABLE
watch manual Field Tags ⓘ
Add a tag                                                            SAVE AS TEMPLATE SAVE                                                                 Go to Help Page ＃ SYSTEMS AND METHODS FOR DEVELOPMENT AND DEPLOYMENT OF SOFTWARE PLATFORMS HAVING ADVANCED WORKFLOW AND EVENT PROCESSING COMPONENTS

CROSS-REFERENCE TO RELATED APPLICATIONS

This application claims priority to and the benefit of U.S. Provisional Patent Application No. 62/528,317 filed on Jul. 3, 2017, the contents of which are incorporated by reference herein in their entirety.

TECHNICAL FIELD

This disclosure is related to improved software development and deployment platforms that enable advanced electronic forms to be generated and deployed in real-time using advanced workflow and event processing components to define and implement desired rules and to enrich data.

BACKGROUND

Modern technologies and techniques used to create and customize enterprise software applications suffer from certain drawbacks. Such applications often collect and present information and data at least in part using user-facing interfaces, and process the data using back-end systems. However, the underlying configuration of the components that handle these different aspects is often disjointed, thus hindering efficient and effective development and deployment of software applications. For example, current techniques typically separate the underlying rules governing the logic for processing data from client-side components that are accessed by the end-users. Defining software applications in this fashion is time-consuming and inefficient due, at least in part, to the resources required to complete development, integrate the applications into the back-end systems, and perform ongoing maintenance of the software. This problem is compounded in situations in which many different software applications are offered or deployed.

For example, electronic forms are used by software applications (e.g., web applications and/or client-side software applications) to collect data in various scenarios. In many cases, individuals or companies may desire advanced functionality (e.g., advanced control over event handling, workflow, and/or navigation) to be incorporated into the electronic forms. However, conventional techniques for creating advanced electronic forms are plagued by the challenges discussed above. That is, conventional techniques for creating advanced electronic forms typically require different skilled users with advanced programming knowledge to separately design an interface layer to collect the data, a logic layer to specify rules for the electronic form, and a storage layer to store data associated with the electronic forms. These layers are often designed by separate software development teams who need to ensure that the three layers are properly synced with one another. In many cases, additional problems can arise in situations where the electronic forms need to be integrated into existing systems (e.g., back-end computing platforms for a company or enterprise). Because the creation and integration of software and advanced electronic forms can be resource-intensive and extremely time-consuming, this prevents companies or enterprises from rapidly launching new customized and well-defined products and/or services.

While certain conventional solutions may exist which enable non-technical users to create electronic forms to a limited extent, these solutions do not allow advanced functionality and rules definition to be incorporated into the electronic forms. Instead, these solutions merely allow such users to create basic forms with minimal customization and are often of limited utility for companies or enterprises that desire electronic forms with enhanced features. These conventional solutions also typically provide no means to deploy the electronic forms and/or to integrate the electronic forms into existing systems or computing platforms.

BRIEF DESCRIPTION OF DRAWINGS

To facilitate further description of the embodiments, the following drawings are provided, in which like references are intended to refer to like or corresponding parts, and in which:

FIG. 5 is an exemplary customization interface for a checkbox component in accordance with certain embodiments;

FIG. 7 is an exemplary customization interface for a date selector component in accordance with certain embodiments;

FIG. 8 is an exemplary customization interface for a decision component in accordance with certain embodiments;

FIG. 9A is an exemplary customization interface for a workflow component in accordance with certain embodiments;

DETAILED DESCRIPTION OF EXEMPLARY EMBODIMENTS

Figure 1:
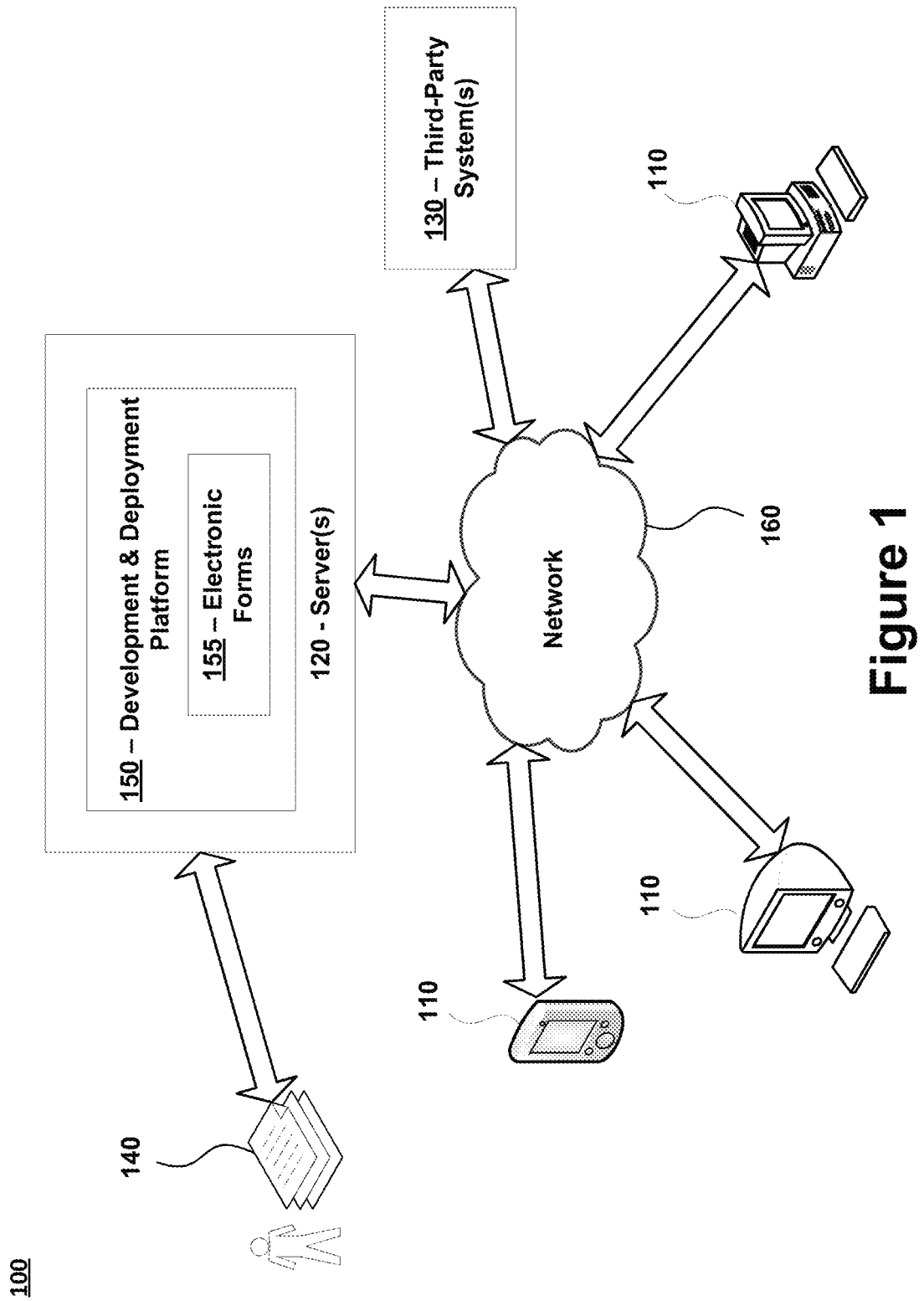
FIG. 1 is a diagram of an exemplary system for developing and deploying electronic forms in accordance with certain embodiments.

The present disclosure relates to systems, methods, apparatuses, and computer program products that enable the dynamic generation and deployment of software and advanced electronic forms for use in a variety of computing environments. A development and deployment platform provides specialized graphical user interfaces (GUIs) that enable the generation of the advanced electronic forms. The GUI-based environment can include a form generation interface that enables users to drag-and-drop components into a development window to define the content, functionality, workflow, background processes, and other criteria for the electronic forms. The components may correspond to predefined or pre-packaged software bundles that can be integrated into the electronic forms being created to define input fields, design layouts, application functions, preconfigured templates, and advanced control features (e.g., which allow for advanced event and workflow control) for the electronic forms. Each of the components may be associated with a customization interface that enables the parameters, content, functionality, and/or other features of the components to be customized. After electronic forms are completed, options can be selected to deploy the forms in a cloud-based environment and/or in other ways. In this manner, the GUI-based development environment enables advanced electronic forms to be created by users in real-time without any technical or programming knowledge. The platform can then instantly deploy the advanced electronic forms and related software for newly-created products and services.

In certain embodiments, the electronic form solutions described herein may be viewed as an improvement on traditional paradigms utilized to create application programs. Traditionally, application programs can be divided into three separate layers: an interface layer that allows for interaction with end users; a logic layer that controls the execution of the program; and a storage layer that stores data associated with the program. The development environment disclosed herein can create an electronic form application that bundles all three of these layers into an application package that can be easily integrated and deployed by any existing system. In certain embodiments, this may be accomplished, at least in part, by integrating the logic layer directly into the components that are utilized to construct the interface layer, and building a database into the software bundle that includes the electronic form application.

Another improvement provided by the platform relates to the advanced control components that are made available via the GUI-based development environment. These components permit users to precisely define various event processing and workflow management operations that could previously only be implemented with significant efforts by developers having in-depth programming knowledge.

One particularly useful control component is a decision component. Generally speaking, the decision component permits actions to be executed by background processes of the electronic forms in response to detecting specified inputs or events. The actions can be executed in real-time as the electronic forms are being filled out without having to reload a webpage or application that is presenting the electronic forms. The decision component includes a customization interface that enables users to identify a first set of components to be monitored in real-time as the forms are being filled out, to identify actions that should be executed in connection with a second set of components in response to inputs received via the first set of components, and to specify logic and/or conditions that determine if and when such actions should be executed. The decision component enables various actions to be executed in real-time including, but not limited to, validating the contents of the form, changing field values, turning on/off the visibility of the components (e.g., dynamically adding or removing fields in the electronic form), outputting messages on the form interface, transmitting back-end error messages (e.g., for processing by error handlers), navigating to particular pages or sections of the form, and/or performing other functions. All of this functionality is able to be specified by users who may have little or no technical knowledge or programming skills.

Another useful control component is the workflow component. Generally speaking, the workflow component enables a non-technical user to design custom background processes that enable advanced processing of inputs received via an electronic form and outputs presented on the electronic form. The workflow component is versatile and can be tailored to accommodate a wide variety of functions. A customization interface associated with the workflow component enables a node diagram to be defined for incorporating dynamic processing operations into the electronic form. Input nodes, processing nodes, and output nodes can be inserted into the diagram and mapped to one another to define the dynamic operations. The input nodes can correspond to fields or components of the electronic form that are monitored in real-time to detect when inputs are received. Each of the input nodes can be mapped to one or more processing nodes which can perform various operations on the data received via the input nodes. For example, the processing nodes can be configured to perform filtering, selecting, sorting, deleting, mapping, merging, appending, parsing, natural language processing (NLP), and/or other types of operations on the data received via the input nodes. The processing nodes can then be mapped to one or more output nodes, which may correspond to fields or components in the electronic form that are updated in real-time to output the data generated by the processing nodes. Once again, all of this functionality is able to be specified by users who may have little or no technical knowledge or programming skills.

After an electronic form has been created, the development and deployment platform provides an integration tool that enables the electronic form to be deployed (e.g., by making the form available to end-users in a public and/or private setting). In certain embodiments, the electronic forms created via the platform are deployed directly on the platform itself (e.g., by creating an instance of the form which resides in a cloud-based environment associated with the platform) and/or deployed by third-party systems (e.g., platforms, websites, or systems which are hosted by individuals or entities external to the platform). In certain embodiments, the creation of an electronic form automatically generates a corresponding application programming interface (API) associated with the electronic form. Thus, once the form is deployed, the API can enable the electronic form to be directly queried and/or executed without accessing a GUI corresponding to the form. Any data collected by the electronic form (via the GUI and/or API associated with the form) can be stored in one or more databases.

A machine learning component of the platform can be configured to process the data collected by the electronic forms. The manner in which the machine learning component processes the information can vary based on the nature of the form and/or the purpose of the form. In certain embodiments, the machine learning component may analyze aggregated data previously collected via one or more of the electronic forms to identify rules, fields, and/or logic associated with the forms that should be modified (e.g., to remove or modify fields and parameters that are required for validation). The rules and/or logic identified by the machine learning component can be based on various business objectives as discussed in further detail below.

In certain embodiments, the machine learning component executes functions for enriching the data collected by the platform and making predictions based on previously collected data. For example, the machine learning component can enrich data collected by the platform by automatically converting and mapping hard copy forms to electronic forms, detecting potential validation and/or NIGO ("not in good order") issues, and calculating confidence scores related to the conversion. The machine learning component can also be configured to analyze aggregated data to predict various trends and factors (e.g., which may be related to the products and/or services associated with the electronic forms).

The technologies discussed herein can be used in a variety of contexts and environments. Generally speaking, these technologies may be useful for any system or industry that intakes large quantities of data through various sources, and/or that desires electronic forms that can be easily customized and deployed. For example, integrating the present technologies into an insurance platform can enable the platform to quickly and easily define and deploy customized insurance products to end-users. Another useful application of these technologies is in the context of the healthcare industry. For example, integrating the present technologies into an electronic healthcare platform can enable the platform to quickly and easily define and deploy forms associated with patient onboarding, electronic medical records, medical insurance products, and/or the like. Another useful application of these technologies is in the context of the financial industry. For example, integrating the present technologies into a financial platform can enable the platform to quickly and easily define and deploy forms associated with obtaining loans, mortgages, brokerage accounts, financial products, and/or the like. Other industries and/or sectors in which these technologies can be applied include the real estate industry, travel industry, marketing and advertising industry, education industry, accounting industry, and the public sector. The technologies discussed herein can also be applied to other industries and/or systems other than those explicitly mentioned herein.

As evidenced by the disclosure herein, the inventive techniques set forth in the disclosure are rooted in computer technologies that overcome existing problems in known software development and deployment solutions, specifically problems dealing with creating and deploying advanced electronic forms. The techniques described in this disclosure provide a technical solution (e.g., one that includes a specialized GUI-based development environment that allows advanced functionality to be incorporated into the electronic forms and which provides customization of the forms at granular levels) for overcoming such limitations. For example, the GUI-based development environment provided by the development and deployment platform described herein can facilitate electronic, real-time, and dynamic form creation by providing users with customizable, pre-packaged software components that can be dragged-and-dropped into a development window for creating the electronic forms. This technology-based solution marks an improvement over existing computing capabilities and functionalities related to electronic form development by enabling advanced functionality to be incorporated into the electronic forms by users who have no technical knowledge or programming skills, and enabling instant deployment of such forms within an integrated software platform.

The GUI-based software development environment described herein enables users to easily define and customize rulesets for the electronic forms being created and/or modified. As various components (e.g., decision components, workflow components, input field components, layout components, etc.) are dragged-and-dropped, or otherwise inserted, into a development window to define an electronic form, the development environment automatically inserts programming code, logic, and/or instructions into the electronic form for defining a ruleset that controls the execution and presentation of the electronic form. The functions configured to automatically create these rulesets, which allow for advanced processing operations to be implemented in the electronic forms, improves the technological field related to software development.

In certain embodiments, a system is provided which comprises one or more computing devices comprising one or more processors and one or more non-transitory storage devices for storing instructions, wherein execution of the instructions by the one or more processors causes the one or more computing devices to: provide access to a software development platform that includes one or more graphical user interface (GUIs) configured to create or modify an electronic form; present, via the one or more GUIs, a development window that is configured to define the electronic form; detect form components that are dragged-and-dropped into the development window to incorporate content, functionality, background processes, and event handling operations for the electronic form being created or modified; receive, from customization interfaces associated with the form components, selections to customize parameters for each of the form components added to the electronic form being created or modified; and generate or update the electronic form based on the form components that are dragged-and-dropped into the development window and based on the selections received from the customization interfaces.

In certain embodiments, a method is provided which comprises: providing access to a software development platform that includes one or more graphical user interface (GUIs) configured to create or modify an electronic form; presenting, via the one or more GUIs, a development window that is configured to define the electronic form; detecting form components that are dragged-and-dropped into the development window to incorporate content, functionality, background processes, and event handling operations for the electronic form being created or modified; receiving, from customization interfaces associated with the form components, selections to customize parameters for each of the form components added to the electronic form being created or modified; and generating or updating the electronic form based on the form components that are dragged-and-dropped into the development window and based on the selections received from the customization interfaces.

The embodiments described in this disclosure can be combined in various ways. Any aspect or feature that is described for one embodiment can be incorporated to any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features, or components as being implemented in software or hardware, it should be recognized that any embodiment, feature, or component that is described in the present application may be implemented in hardware and/or software.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk, and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

FIG. 1 is an exemplary system 100 according to certain embodiments. In this exemplary system 100, a development and deployment platform 150 is stored on one or more servers 120. The development and deployment platform 150 can configured to perform any and all functions described herein with respect to generating and/or creating electronic forms 155, hosting and/or providing access to the electronic forms 155, and/or deploying and/or collecting data and information via the electronic forms 155. For example, in certain embodiments, the development and deployment platform 150 enables users (e.g., non-technical users with no programming knowledge) to generate and/or create advanced electronic forms 155. As explained in further detail below, the development and deployment platform 150 can provide a software development toolkit that enables the electronic forms 155 to be quickly and easily created and customized in a GUI-based environment. After the electronic forms 155 are created, the development and deployment platform 150 can also perform functions associated with the hosting the electronic forms 155 (e.g., to enable end-users to access the forms), collecting and storing data submitted via the electronic forms 155, and/or providing one or more third-party systems 130 with access to the collected data.

The electronic forms 155 can include web-based forms (e.g., which are accessible via a network 160 that includes the Internet) and/or local application forms 155 (e.g., which are presented by local applications running a computing device 110 and/or server 120). In certain embodiments, the electronic forms 155 can be implemented using Hypertext Markup Language (HTML) and/or one or more web-based programming languages (e.g., such as JavaScript, PHP, CSS, Perl, SQL, Ruby, and/or other web-based languages). The electronic forms 155 can alternatively, or additionally, be implemented in other programming languages such as Java, C++, C, Python, and/or other languages. The electronic forms 155 can represent an application with an interface layer for collecting data, and logic layer for implementing rules associated with the electronic forms 155. The electronic forms 155 can also include, and/or communicate with one or more databases, which provide a storage layer for the electronic forms 155.

One or more computing devices 110 may be configured to access the development and deployment platform 150 over a network 160. The network 160 may represent any type of communication network, e.g., such as one that comprises a local area network (e.g., a Wi-Fi network), a personal area network (e.g., a Bluetooth network), a wide area network, an intranet, the Internet, a cellular network, and/or other types of networks. Additionally, or alternatively, the development and deployment platform 150 may be accessed directly from the device or devices hosting the platform (e.g., via one or more input devices attached to the servers 120 hosting the development and deployment platform 150).

In certain embodiments, the computing devices 110 may represent desktop computers, laptop computers, mobile devices (e.g., smart phones, personal digital assistants, tablet devices, and/or any other device that is mobile in nature), and/or other types of computing devices. In certain embodiments, the development and deployment platform 150 is stored on one or more servers 120. The one or more servers 120 may generally represent any type of computing device, including any of the computing devices 110 mentioned above. In certain embodiments, the one or more servers 120 comprise one or more mainframe computing devices that execute web servers for communicating with the computing devices 110, third-party systems 130, and other devices over the network 160 (e.g., such as the Internet). The one or more servers 120 may be configured to provide interfaces on the computing devices 110 for performing any and all of the functions offered by the development and deployment platform 150.

The users accessing the development and deployment platform 150 (e.g., either directly from the device hosting the platform and/or indirectly by a computing device 110 over the network 160) may include individuals who are seeking to build, create, and/or deploy the electronic forms 155. For example, the development and deployment platform 150 may enable administrators associated with hosting the platform 150 and/or other individuals (e.g., individuals associated with one or more third-party systems 130) to create and/or deploy the electronic forms 155. The users accessing the development and deployment platform 150 can also include individuals that are seeking to submit data via electronic forms 155 after the electronic forms 155 are created. For example, the users may utilize the computing devices 110 to access electronic forms hosted by the development and deployment platform 150 and to submit information via the electronic forms 155.

In certain embodiments, the development and deployment platform 150 may be hosted by an entity that provides assistance to one or more third-party systems 130 with collecting data and information. For example, the third-party systems 130 may be associated with entities that provide products and/or services in various industries (e.g., such as in the insurance, healthcare, financial, real estate, travel, marketing, advertising, education, accounting, and/or other industry). The third-party systems 130 may including websites, computing equipment (e.g., such as computing devices 110 and servers 120), and back-end systems that are used to provide customers with various products and/or services, some or all of which may rely on or utilize data that is provided by the customers via electronic forms 155 and/or hardcopy forms 140 (e.g., paper forms). The development and deployment platform 150 can be used to create, design, and deploy electronic forms 150 for the third-party systems 130. The electronic forms 150 created for the third-party systems 130 can be hosted on the development and deployment platform 150 and/or can be hosted by the third-party systems 130. The development and deployment platform 150 can be configured to collect and store any data and information received by the electronic forms 155. The development and deployment platform 150 can also be configured to provide the third-party systems 130 and/or individuals associated with the third-party systems 130 with access to the data and information collected via the electronic forms 155.

In certain embodiments, the development and deployment platform 150 can also be configured to receive and process hardcopy forms 140 (e.g., which may include paper forms or the like). For example, upon receiving the hardcopy forms 140, the development and deployment platform 150 may convert the hardcopy forms 140 to electronic forms 155. This conversion process may include scanning into the hardcopy forms 140 (e.g., using optical scanning equipment), analyzing the scanned data to automatically extract the information being provided by the hardcopy forms 140, and automatically populating fields of corresponding electronic forms 155 (or corresponding APIs associated with the forms) with the information from the hardcopy forms 140. The data associated with the converted forms can then be made available to the third-party systems 130 via the development and deployment platform 150.

Thus, in certain embodiments, the development and deployment platform 150 can provide an end-to-end system for collecting and processing information submitted in any medium (e.g., including both hardcopy forms 140 and electronic forms 155) for the third-party systems 130. The development and deployment platform 150 can also perform functions for validating the information received by the forms to ensure that the information is complete and to eliminate any NIGO ("not in good order") issues. This allows the third-party systems 130 to focus to their core functions and roles associated with providing products and/or services, and to avoid spending time and resources collecting and validating form information. In certain embodiments, the development and deployment platform 150 can be integrated with the third-party systems 130 (e.g., such that the entity or system hosting the development and deployment platform 150 is the same entity or system that is affiliated with the third-party systems 130).

The system 100 in FIG. 1 may include any number of computing devices 110, any number of servers 120, and any number of third-party systems 130. All the system components, including the computing devices 110, servers 120, third-party systems 130, and development and deployment platform 150 can be configured to communicate directly with each other and/or over the network 160 via wired or wireless communication links, or a combination of the two. Each of the computing devices 110, servers 120, third-party systems 130, and development and deployment platform 150 can also be equipped with one or more transceiver devices, one or more computer storage devices (e.g., RAM, ROM, PROM, SRAM, etc.), and one or more processing devices (e.g., a central processing unit) that are capable of executing computer program instructions. The computer storage devices are preferably physical, non-transitory mediums.

Figure 2:
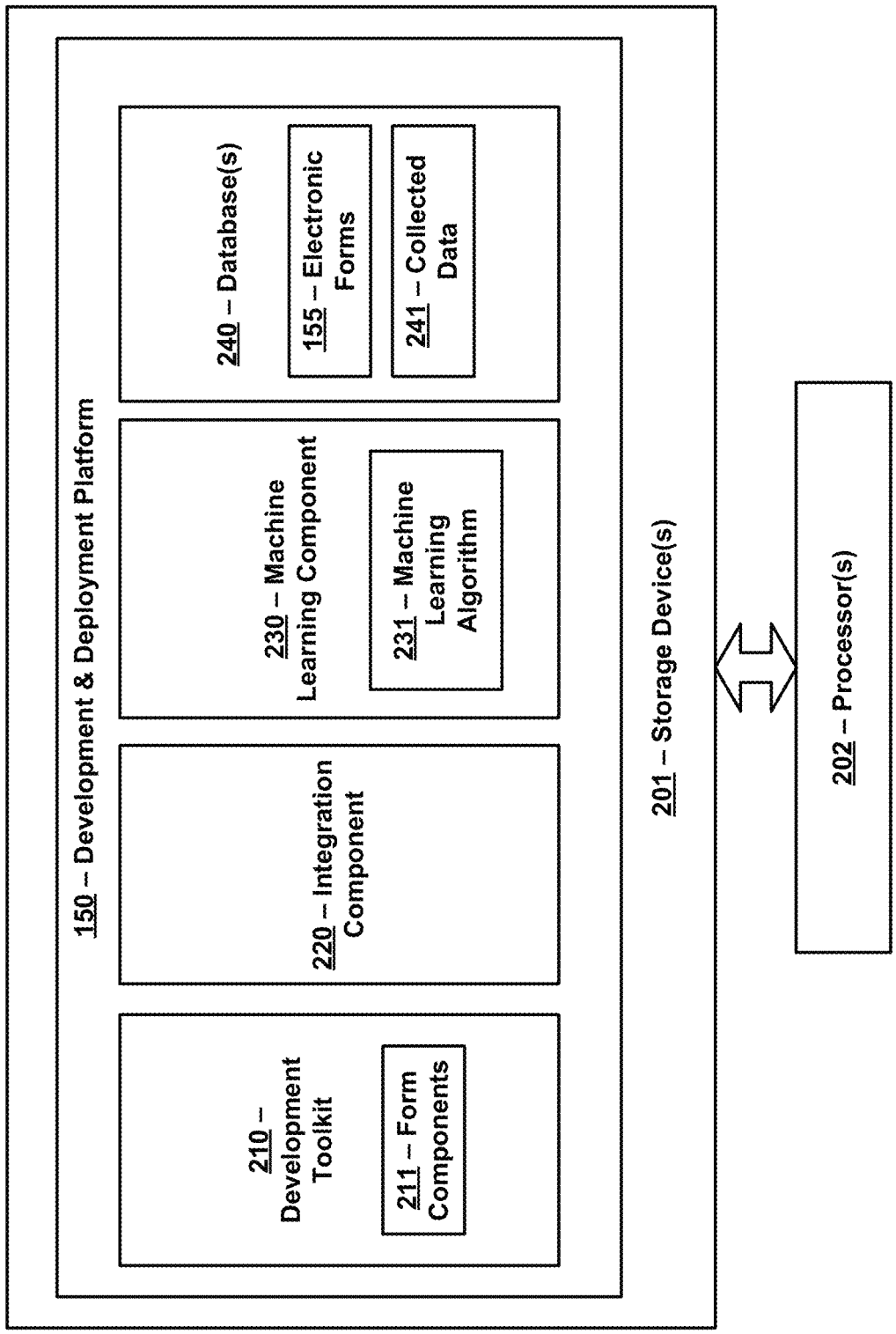
FIG. 2 is a block diagram depicting a detailed view of an exemplary development and deployment platform in accordance with certain embodiments.

FIG. 2 is a block diagram providing a detailed view of an exemplary development and deployment platform 150 in accordance with certain embodiments of the present invention. The development and deployment platform 150 can be stored on one or more storage devices 201 that are in communication with one or more processors 202. The one or more storage devices 201 can include: (i) non-volatile memory, such as, for example, read only memory (ROM) or programmable read only memory (PROM); and/or (ii) volatile memory, such as, for example, random access memory (RAM), dynamic RAM (DRAM), static RAM (SRAM), etc. In these or other embodiments, storage devices 201 can comprise: (i) non-transitory memory and/or (ii) transitory memory. The one or more processors 202 can include one or more central processing units (CPUs), controllers, microprocessors, digital signal processors, and/or computational circuits. The one or more storage devices 201 store data, code, and instructions associated with implementing a development toolkit 210, an integration component 220, a machine learning component 230, and a database 240. The one or more processors 202 are configured to execute instructions associated with these components. Each of these components is described in further detail below.

The development toolkit 210 can be configured to perform any/or all functions described herein with respect to generating, creating, and/or updating electronic forms 155. In certain embodiments, the development toolkit 210 is configured to display one or more GUIs that enable non-technical users to create advanced forms. As discussed in further detail with respect to FIG. 3, the GUIs provided by the development toolkit 210 can include a form generation interface that enables users to drag-and-drop form components 211 into a development window. The form components 211 may correspond to pre-defined and/or pre-packaged software bundles that are used to define and customize the content, functionality, design layout, workflow, event handling, and other criteria for the electronic forms 155.

For example, the form components 211 may correspond to pre-packaged software bundles that can be integrated into the electronic forms being created to define and customize input fields (e.g., which may include text boxes, radio buttons, check boxes, text areas, submit buttons, dropdown menus, file upload fields, etc.), design layouts (e.g., which may include pre-configured tables, columns, window panels, and/or other layout features for organizing and presenting information on the forms), application functions (e.g., pre-configured applications modules that can include date selectors, e-signature fields, calculators, text editors, or the like), templates (e.g., which can include previously created forms or portions of forms that can be reused or recycled), and advanced control features (e.g., which allow for advanced control of background processes for event handling and workflow control). The advanced control components that are made available via the GUI-based development environment permit users to precisely define various event processing and workflow management operations associated with the electronic forms. Examples of advanced control components, such as a decision component and a workflow component, are discussed in further detail below.

Each of the form components 211 may be associated with a customization interface that enables the users creating the electronic forms 155 to customize various aspects of the form components 211 that are added to the electronic form 155. For example, the customization interfaces may permit the users to customize the parameters, content, functionality, and/or other features of the components to be customized. Examples of exemplary customization interfaces are discussed below with respect to FIGS. 4-8 and 9A-9B. After the user creating the form has finishing adding and customizing the form components 211 for the electronic forms 155, the user can select an option to save the electronic forms 155 in the database 240. The user can access any saved forms via the development toolkit 210 at a later time in order to update and/or modify the saved forms.

The integration component 220 can be configured to perform any/or all functions described herein with respect to deploying completed electronic forms 155 and/or making the electronic forms 155 available to users. For example, after a user creates an electronic form 155 utilizing the development toolkit 210, the integration component 220 enables the user to deploy the electronic form 155. Once the electronic form 155 is deployed, various customers (e.g., individuals seeking insurance or financial products and services) or other users can access the electronic form 155 and submit information via the electronic form 155.

Any information collected via an electronic form 155 that has been deployed may be saved and stored as collected data 241 in the database 240. The collected data 241 may include data and information corresponding to one or more products and/or services being offered by entities associated with the third-party systems 130. For example, the collected data 241 saved in the database may include personal information (e.g., name, age, address, etc. associated with a customer), product information (e.g., selections made by the customer which correspond to options for products and/or services associated with the electronic form), documents (e.g., which may be uploaded via the form), etc.

The integration component 220 can deploy the electronic forms 155 in various ways. In certain embodiments, the integration component 220 deploys the electronic forms 155 by storing the electronic forms 155 on a server(s) 120 and/or in a cloud environment associated with the development and deployment platform 150. In such embodiments, the electronic forms 155 may be managed and/or hosted by the development and deployment platform 150. Customers or other users seeking to submit information via the electronic forms 155 can then access the development and deployment platform 150 (e.g., using the computing devices 110) to provide information via the electronic forms 155. Additionally, or alternatively, the integration component 220 may deploy the electronic forms 155 by integrating the forms into one or more third-party systems 130. In such embodiments, the electronic forms 155 can be stored on a server(s) and/or in a cloud environment associated the third-party systems 130. Customers or other users seeking to submit information via the electronic forms 155 can then access the third-party systems 130 (e.g., using the computing devices 110) to provide information via the electronic forms 155. All data collected via the electronic forms 155 (e.g., such as the collected data 241), whether hosted on the development and deployment platform 150 and/or the third-party systems 130 can be stored in the database 240.

Once deployed, the integration component 220 and/or other components of the development and deployment platform 150 can execute a form passing procedure that enables the forms to be passed among multiple devices (e.g., computing devices 110) while being filled out or during completion. The form passing procedure can be useful for protecting confidential and/or sensitive information that is being submitted via the forms, and for masking such information from certain individuals who are assisting with the completion of the forms. The software development toolkit 211 described above can include components and/or other options for integrating the form passing procedure into the electronic forms 155.

Consider a scenario where an intermediary (e.g., a broker, agent, and/or other individual) is assisting a customer with filling out an electronic form 155. In some cases, the electronic form 155 may request confidential and/or sensitive information (e.g., which may be related to medical records, legal records, governmental records, etc.) and the customer may not want to disclose this information to the intermediary. In this scenario, while the intermediary is filling out the electronic form 155, the intermediary may select an option for passing the electronic form 155 from a computing device 110 associated with the intermediary to a computing device 110 of the customer (e.g., the customer's mobile device). The form can be passed to the device of the customer via the network 160 in various ways (e.g., via a link included in an e-mail or text sent to the customer, an interface presented on by application stored on the customer's device, a webpage or website that the customer can access, and/or in other ways). This enables the customer to provide the confidential and/or sensitive information without disclosing the information to the intermediary. After the customer has completed the portion of the electronic form 155 requesting the confidential and/or sensitive information, the customer can submit the electronic form 155 and/or pass the form back to the intermediary for completion. If the electronic form 155 is passed by back to the intermediary, the rules associated with the electronic form can prevent the intermediary from viewing and/or accessing the confidential and/or sensitive information.

The above example described an application of the form passing procedure among two individuals. However, it should be understood that the form passing procedure can be utilized to share an electronic form 155 among any number of individuals, and that the form passing procedure can be utilized in other contexts to permit sharing of the electronic forms 155.

The machine learning component 230 can include one or more machine learning algorithms 231 that are configured to analyze the data stored in the database 240 (e.g., the collected data 241) and/or other data for a variety of purposes. In certain embodiments, the machine learning algorithms 231 analyze the collected data 241 to optimize the products and/or services being offered by the third-party systems 130. For example, the machine learning algorithms 231 analyze the collected data 241 (e.g., which may be aggregated over time) to identify rules, parameters, and/or other features of the products that can be modified or removed to optimize the products and/or services being offered. The machine learning component 230 may display recommendations to change or modify such data on an interface along with statistics associated with the analysis of the stored data.

As illustrated by way of example, consider a scenario in which the development and deployment platform 150 is utilized to provide assistance to a third-party system 130 that provides insurance products and/or services. Forms may be provided for onboarding new customers in connection with the products and/or services, and also for processing insurance claims submitted in connection with existing customers. In this scenario, the machine learning component 230 (e.g., using the machine learning algorithms 231) may be configured to analyze contents of the database 240 to identify rules that have a negative impact on the underwriting process for the insurance products and/or services. The rules may be integrated into the electronic forms 155 corresponding to the products and/or services as input fields, parameters, and/or logic that is required for validation of the onboarding form. By analyzing data associated with the products and/or services (e.g., including the collected data 241 associated with previously submitted insurance claims), the machine learning component 230 may identify rules that should be modified or removed to optimize the products and/or services. This may include identifying rules that have a minimal impact on the risks associated with the insurance products and/or services (e.g., risks associated with the underwriting process), but which may be required to validate completion of the electronic forms 155 associated with the products and/or services. The machine learning component 230 may then generate an interface that displays recommendations and statistical data related to the analysis. The interface may also provide options for automatically modifying the portions of the form that correspond to the identified rules and/or accessing the electronic form via the development toolkit 210 to enable editing of the electronic form.

The machine learning component 230 can be configured to perform similar analyses for other types of products and/or services offered by the third-party systems. For example, the machine learning component 230 can be configured to optimize products and/or services offered in connection with the healthcare, finance, real estate, travel, marketing, advertising, education, and/or accounting industry.

The machine learning component 230 can also be configured to make predictions associated with existing and future products and services. For example, the machine learning algorithms 231 may analyze the data aggregated by the platform 150 to predict trends associated with such products and services. This may include predicting a likelihood of success and/or failure of a product or service based on analysis of the aggregated data. Such predictions consider the specific types of products and/or services being offered, the particular geographic areas where the products and/or services being offered, demographic information (e.g., age, sex, race, etc.) of an existing or anticipated customer base, and/or other information that may be discerned from the aggregated data.

In certain embodiments, the machine learning component 230 also executes functions for enriching the data collected by the platform. This may include enriching data collected by the platform automatically via hard copy forms 140. For example, the machine learning algorithms 231 can be configured to convert hard copy forms 140 to electronic forms 155 by automatically mapping data from the hard copy forms 140 to electronic forms 155. The automatic mapping of forms may be performed by training the machine learning component 230 using a set of training data that teaches the machine learning algorithms 231 to determine appropriate mapping information.

The machine learning component 230 can also analyze any information collected via the hardcopy forms 140 and/or electronic forms 155 for potential validation and/or NIGO-related issues, and compute related confidence scores. The confidence scores computed by the machine learning component can indicate confidence measures associated with the accuracies of conversions (e.g., conversions from hardcopy forms 140 to electronic forms 155), confidence measures associated eliminating validation and NIGO-related issues, and/or other similar types of metrics.

The database 240 can store any and all data associated with the development and deployment platform 150. This may include any data associated with creating electronic forms 155, any data collected via the electronic forms 155, any data associated with settings for the third-party systems 130, and/or any other data. Also, while the database 240 in FIG. 2 is depicted as a single component, it should be understood that the database 240 may represent a plurality of databases 240. In certain embodiments, separate databases 240 can be maintained for each of the third-party systems 130 serviced by the development and deployment platform 150 and/or for each of the electronic forms 155 created by the platform 150.

While the components of the development and deployment platform 150 may be depicted in FIG. 2 as being distinct or separate from one other, it should be recognized that this distinction may be a logical distinction rather than an actual or physical distinction. Any or all of the sub-components can be combined with one another to perform the functions described herein, and any aspect or feature that is described as being performed by one component can be performed by any or all of the other sub-components. Also, while the components of the development and deployment platform 150 may be illustrated as being implemented in software in certain portions of this disclosure, it should be recognized that the sub-components described herein may be implemented in hardware and/or software.

Figure 3:
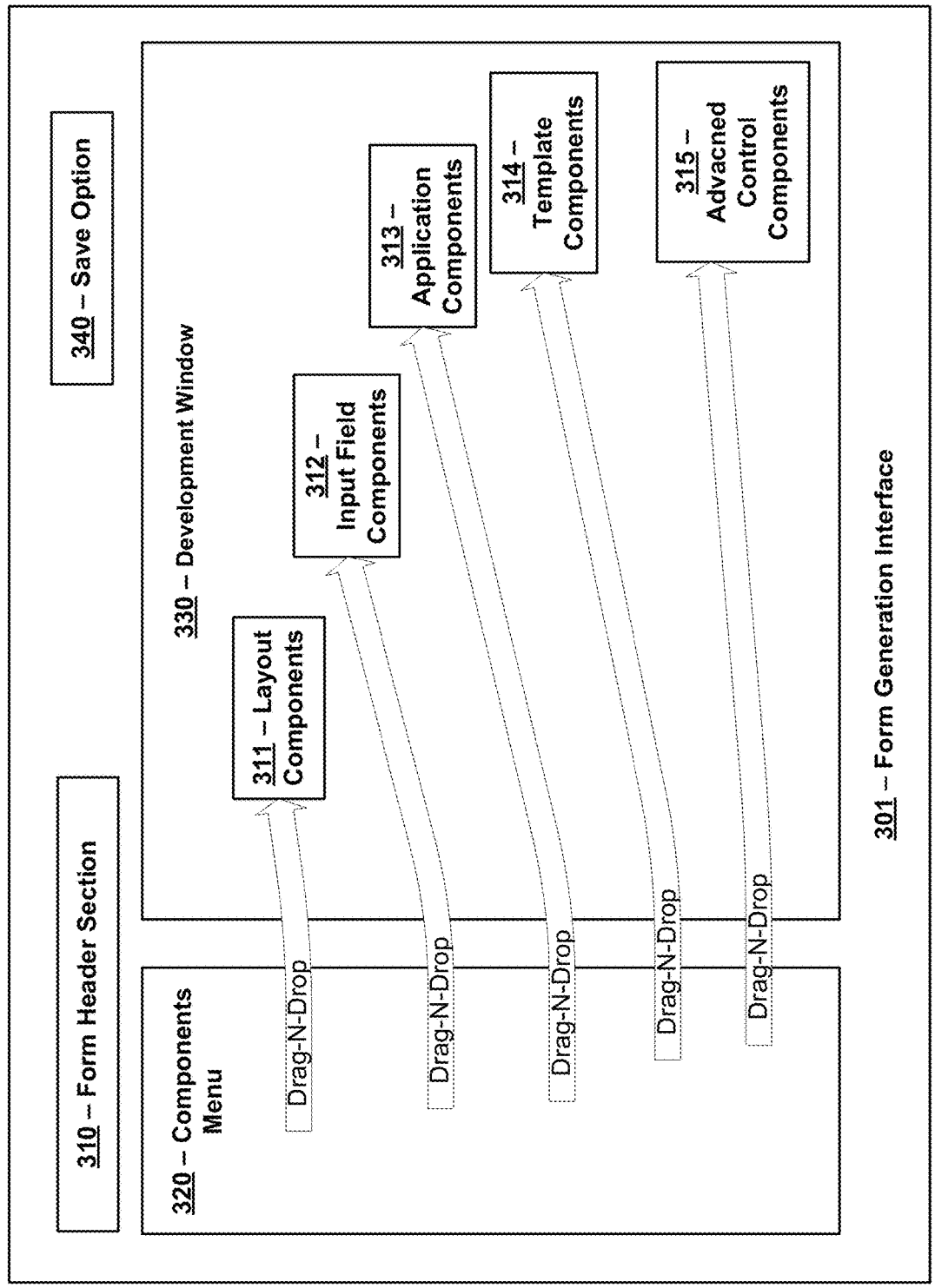
FIG. 3 is an exemplary GUI for creating electronic forms in accordance with certain embodiments.

FIG. 3 is an exemplary form generation interface 300 in accordance with certain embodiments. The form generation interface 300 may be provided by the development toolkit 210 to assist with creating electronic forms 155 and/or modifying existing electronic forms 155. Users (e.g., individuals associated with the platform 150 and/or third-party systems 130) can utilize the form generation interface 300 to create and/or update advanced electronic forms 155 without any technical knowledge or programming experience.

The exemplary form generation interface 300 includes a form header section 310, a component menu 320, a development window 330, and a save option 340. To create an electronic form 155 using the interface 300, the users can drag-and-drop various form components 211 from the component menu 320 into the development window 330. The developer window 330 is configured to detect when a form component 211 is dragged-and-dropped into the development window 330, to identify the specific type of form component 211 that is being dragged-and-dropped into the development window 330, and to add the component 211 that is being dragged-and-dropped into the development window 330 into the electronic form 155 being constructed. For each form component 211 added to the development window 330, the user can then access a customization interface (e.g., as shown in FIGS. 4-8 and 9A-9B) to customize aspects of the components. The user can also define header information (e.g., the name of the form, the path of the form, etc.) for the form in the form header section 310. Once the form is complete, the user can select the save option 340 to save the electronic form 155 to a database 240.

An exemplary component menu 320 can include a variety of form components 211 including layout components 311, input field components 312, application components 313, template components 314, and advanced control components 315. Examples of each of these components are discussed in further detail below.

The layout components 311 enable the design or layout of the electronic form 155 to be customized. The layout components 311 can be used to customize the presentation and organization of the fields, content, and other features included in the electronic form 155. Other components included in the component menu 320 (e.g., input field 312, application components 313, and/or template components 315) can be dragged-and-dropped into layout components 311 that have been added to the development window 330 to arrange the presentation of these components. Exemplary layout components may include:

(1) Panel Components: A panel component can be dragged-and-dropped into the development window 330 to add a panel to the electronic form 155, or section of the electronic form 155, being created. The panels may correspond to windows on the electronic form that include an option for expanding and/or collapsing the panels. Other components from the component menu 320 can be inserted into the panel.

(2) Column Components: A column component can be dragged-and-dropped into the development window 330 to add one or more columns to the electronic form 155, or section of the electronic form 155, being created. The column component can be used to align content vertically in the one or more columns. Other components from the component menu 320 can be inserted into the columns.

(3) Table Components: A table component can be dragged-and-dropped into the development window 330 to add a table to the electronic form 155, or section of the electronic form 155, being created. The user can specify any number of rows and columns to be included in the table. Other components (e.g., input field components 312 and/or application components 313) from the component menu 320 can be inserted into the cells of the table.

(4) PDF Component: The PDF component can be dragged-and-dropped into the development window 330 to enable conversion of a PDF form to an electronic form. The PDF component enables the user to map the fields of a PDF to the fields of an electronic form 155. Thus, when a PDF document is uploaded by a customer or other user after the form is deployed, the PDF component can automatically convert the information in the PDF document to an electronic form. The PDF component can additionally, or alternatively, enable content submitted via the electronic form to be converted to a PDF file.

The input field components 312 enable the users to add and customize input fields to the electronic form 155 being created. The input field components 312 may be inserted into the layout components 311 to customize the presentation of the form. Exemplary input field components 312 may include:

(1) Text Field Components: A text field component can be dragged-and-dropped into the development window 330 to add a text field input to the electronic form 155, or section of the electronic form 155, being created.

(2) Text Area Components: A text area component can be dragged-and-dropped into the development window 330 to add a text area input to the electronic form 155, or section of the electronic form 155, being created.

(3) Checkbox Components: A checkbox component can be dragged-and-dropped into the development window 330 to add a checkbox input to the electronic form 155, or section of the electronic form 155, being created.

(4) Dropdown Menu Components: A dropdown menu component can be dragged-and-dropped into the development window 330 to add a dropdown menu input to the electronic form 155, or section of the electronic form 155, being created.

(5) Radio Button Components: A radio button component can be dragged-and-dropped into the development window 330 to add a radio button input to the electronic form 155, or section of the electronic form 155, being created.

(6) File Upload Components: A file upload component can be dragged-and-dropped into the development window 330 to add a file upload input field to the electronic form 155, or section of the electronic form 155, being created. The file upload input field allows files to be uploaded through the form.

(7) Password Components: A password component can be dragged-and-dropped into the development window 330 to add a password input field to the electronic form 155, or section of the electronic form 155, being created.

(8) Submit Button Components: A submit button component can be dragged-and-dropped into the development window 330 to add a submission button to the electronic form 155, or section of the electronic form 155, being created.

(9) Hidden Value Components: A hidden value component can be dragged-and-dropped into the development window 330 to store a hidden value for the electronic form 155, or section of the electronic form 155, being created. The hidden values are not visible on the electronic form. The hidden values can be updated in the background by other components added to the form.

The application components 313 enable users to add and customize preconfigured applications or widgets into the electronic form 155 being created. The preconfigured applications or widgets can be configured to collect inputs, display data, and/or perform other functions associated with the electronic form 155. Exemplary application components 313 may include:

(1) Date Selector Components: A data selector component corresponds to a preconfigured application or widget that provides functions for selecting a date. For example, if a date picker component is added to a form, the form may display a selectable icon of a calendar. Upon selecting the icon, the user may navigate through a calendar and select a date and/or time. This date selector component may be dragged-and-dropped into the developer window 330 to incorporate this application or widget into the electronic form 155 being created.

(2) E-Signature Components: An e-signature component corresponds to a preconfigured application or widget that enables users to electronically sign the forms. For example, the signature component may display a box on the form that permits the user to draw a signature using a mouse. This e-signature component may be dragged-and-dropped into the developer window 330 to incorporate this application or widget into the electronic form 155 being created.

(3) Text Editor Components: A text editor component corresponds to a preconfigured application or widget that enables users to edit text in various ways (e.g., to adjust the size, fonts, alignment, and other text features). After the form has been deployed, a customer or other user may access the form and use the text editor to edit text being submitted through the form. This may be useful when the electronic form 155 is being deployed in connection with a third-party service that publishes content and/or which otherwise requires customized text. This text editor component may be dragged-and-dropped into the developer window 330 to incorporate this application or widget into the electronic form 155 being created.

(4) Charts and Graphs Components: A charts and graphs component corresponds to a preconfigured application or widget that enables users to create a variety of charts and/or graphs. For example, charts and graphs can be created to display information to customers or other users who are filling out a deployed form. The charts and graphs can also be updated in real-time based on inputs received when the form is being filled out by the users. This charts and graphs component may be dragged-and-dropped into the developer window 330 to incorporate this application or widget into the electronic form being created.

(5) Image Viewer Components: A text editor component corresponds to a preconfigured application or widget that incorporates an image viewer into the electronic form 155. The image viewer may allow a customer or other user accessing a deployed form to scroll through and/or select one or more images displayed in the image viewer. The user may also be permitted to upload additional images to be included in the image viewer. This image viewer component may be dragged-and-dropped into the developer window 330 to incorporate this application or widget into the electronic form being created.

The template components 314 enable users to reuse or recycle previously created electronic forms 155 and/or portions of previously configured electronic forms 155. For example, the template components 314 may include a previously created login form (e.g., for verifying login information to access accounts) that can be reused across multiple systems simply by dragging-and-dropping the template into the developer window 330. As another example, the template components 314 may include portions of previously created forms that are designed to collect specific types of information (e.g., personal information, financial information, and/or or other data) that are commonly used in many types of forms. Thus, rather than repeatedly designing the same input section of form multiple times, a specific input section of the form can be saved as a template component for use across multiple electronic forms 155.

The advanced control components 315 enable users to customize functions of the electronic form 155 relating to controlling workflow, navigation, and event handling. In many cases, the advanced control components may not be visible to customers or users that access completed forms that have been deployed. Rather, the advanced control components 315 can operate as background processes that control aspects of the workflow, navigation, and event handling for the electronic forms 155. Exemplary advanced control components 315 may include:

(1) Decision Components: A decision component can be dragged-and-dropped into the development window 330 to define and customize processes and/or workflows that are executed in the background of the electronic form. For example, a decision component can trigger values and/or parameters associated with certain form components 211 included in the electronic form 155 to be modified based on inputs received via the electronic forms (e.g., to modify aspects of layout components 311, input field components 312, application components 313, template components 314, and/or other advanced control components 315).

In certain embodiments, the actions triggered by the decision component can be defined using a customization interface. For example, a customization interface associated with a decision component can include an input section that enables the user to identify one or more form components 211 that should be read and/or monitored. The components 211 can be monitored in real-time as customers or users are accessing a deployed form and/or filling out the form. The decision component can also include an output section that enables the user to identify one or more form components 211 that should be modified and/or updated based on the inputs received via the one or more components that are identified in the input section. The output section further enables the user to specify actions that should be taken for modifying the components identified in the output section. Exemplary actions that may be selected can include actions for changing form field values, turning on/off the visibility of the components, outputting messages on the form interface, transmitting back-end error messages (e.g., for processing by error handlers), navigating to particular pages or sections of the form, and/or other functions. A logic section enables the user to input control logic and/or specify conditions under which the actions are executed and/or under which the components identified in the output section are modified. Examples of such a customization interfaces are discussed in further detail below.

(2) Navigation Components: A navigation component can be dragged-and-dropped into the development window 330 to enable users to control navigation between portions of the electronic form 155. This component may be particularly useful when dealing with large forms that have many sections, and can enable the electronic form to control which portions of the form should be presented to the users and in which order. For example, a form may include multiple panels or tables that include input fields for collecting information. The navigation component can control the order in which the panels or tables are presented to the user and/or to determine whether certain panels or tables can be skipped (e.g., not presented to the user) based on previously entered information.

(3) Calculator Components: A calculator component can be dragged-and-dropped into the development window 330 to enable calculations to be performed on values input to the components. For example, the calculator component can run in the background and perform calculations on values entered into the input field components 312 and/or other components.

(4) Workflow Components: A workflow component can be dragged-and-dropped into the development window 330 to enable users to define advanced workflows. Like the decision component, the workflow component can be used to define and customize processes and/or workflows that are executed in the background of the electronic form. For example, the workflow component can define background processes which allow values and parameters of certain components to be modified dynamically (e.g., in real-time as a customer is filling out the form) based on values received by other components.

In certain embodiments, this may be accomplished by using a customization interface associated with the workflow component to create node diagrams that defines the background processes. For example, the workflow component can enable users to generate a diagram that includes input nodes, processing nodes, and output nodes. The input nodes identify components that are monitored for receiving inputs. Data received via the input nodes can be mapped to one or more processing nodes that can be configured to perform various operations (e.g., such as aggregating the received data, filtering the received data, performing natural language processing operations on the received data, merging the received data, sorting the received data, adding new input fields or components to the form being created, modifying layout or designs or the forms, etc.). The one or more processing nodes can also be mapped to one or more output nodes (e.g., that correspond to components of the electronic form that can be modified and/or which can output the data based on the processing operations) to update the electronic form. Examples of such a customization interfaces are discussed in further detail below.

The exemplary components described above are not intended to be an exhaustive listing of all components made available via the development toolkit 210. It should be understood that other types of layout components 311, input field components 312, application components 313, template components 314 and/or advanced control components 315 can be provided by the development toolkit 210 described herein.

The development window 330 can represent a portion of the form generation interface 300 that is used to define and/or visualize the electronic form 155 being generated or modified. In certain embodiments, the development window 330 can be configured to display the electronic form 155 being created and/or modified in a WYSIWYG ("what you see is what you get") editor or format. Generally speaking, a WYSIWYG editor enables the user creating and/or modifying an electronic form 155 to see what the electronic form 155 will look like while the electronic form 155 is being created and/or modified. For example, as layout components 311, input field components 312 and other components are added to the development window 330, the WYSIWYG functionality of the development window 330 enables the user to view how the components will appear when the electronic form 155 is displayed and deployed.

As mentioned above, the components in the components menu 320 can be dragged-and-dropped into the development window 330. The development window 330 can be configured to detect when a component is being dragged-and-dropped into the development window 330. This may include detecting events in real-time (e.g., using HTML and/or JavaScript attributes such as "onmouseover" and/or "onmouseup") as the electronic form 155 is being created. The development window 330 can also be configured to identify the particular type of component (e.g., to detect whether the component is for a text field input or a decision component) that is being added to the electronic form 155 and to insert the component into the electronic form 155 (e.g., to insert the component into the WYSIWYG editor provided by the development window 330). Inserting of the component into the electronic form can include incorporating code and/or programming instructions into the electronic form 155 which enables content and/or functionality associated with the component to be integrated into the electronic form 155. The development window 330 (or other portion of the interface 300) can be configured with instructions that determine how the code corresponding to the components that are dragged-and-dropped into the development window 330 are to be inserted into the electronic form 155 being created. As discussed in further detail below, each component can include a customization interface that enables the users to customize various aspects of the components. After a user has completed an electronic form 155, the user can select the save option 340 to save the electronic form to a database 240.

The exemplary form generation interface 300 described above with reference to FIG. 3 is not intended to be limiting and it should be understood that the interface and associated functionality can be modified in various ways without departing from the principles of this disclosure. For example, in certain embodiments, the components in the components menu 320 can be added to the electronic form 155 being created and/or modified in ways other than dragging-and-dropping the components into the development window 330 (e.g., such as by selecting buttons or hyperlinks to add the components). Likewise, components other than those explicitly described can be used to create and/or modify the electronic forms 155.

FIGS. 4-8 and 9A-9B illustrate exemplary customization interfaces that may be associated with the form components 211. As mentioned above, each of the form components 211 (e.g., including the layout components 311, input field components 312, application components 313, template components 314, and/or advanced control components 315) can be associated with a customization interface that enables the users creating and/or modifying the electronic forms 155 to customize various aspects of the components (e.g., aspects relating to parameters, values, visibility, functionality, etc.). Each of the customization interfaces can include one or more text fields, check boxes, radio buttons, and/or other input options for that enable non-technical users with no programming knowledge to customize the components.

The customization interfaces can be accessed via the form generation interface 300. For example, the customization interfaces may be displayed automatically each time a component is added to the development window 330. Also, after the components are added to the development window 330, the components may be displayed in the development window 330 with options or buttons that can be selected to access the customization interfaces. After a user has finished customizing the component using a corresponding customization interface, the user can select a save option or button to save the settings for the component and to incorporate the settings into the electronic form 155 being created and/or modified. The user can additionally select a save template option to create a template that includes the settings for the component.

Figure 4:
FIG. 4 is an exemplary customization interface for a text field component in accordance with certain embodiments.

FIGS. 4 and 5 disclose exemplary interfaces that can be provided in connection with certain input field components 312. More specifically, FIG. 4 is an exemplary customization interface 400 that can enable a user to customize a text field component in accordance with certain embodiments, and FIG. 5 is an exemplary customization interface 500 that can enable a user to customize a checkbox component in accordance with certain embodiments.

Figure 6:
FIG. 6 is an exemplary customization interface for an e-signature component in accordance with certain embodiments.

FIGS. 6 and 7 disclose exemplary interfaces that can be provided in connection with certain application components 313. More specifically, FIG. 6 is an exemplary customization interface 600 that can enable a user to customize an e-signature component in accordance with certain embodiments, and FIG. 7 is an exemplary customization interface 700 that can enable a user to customize a date selector component in accordance with certain embodiments.

Figure 9B:
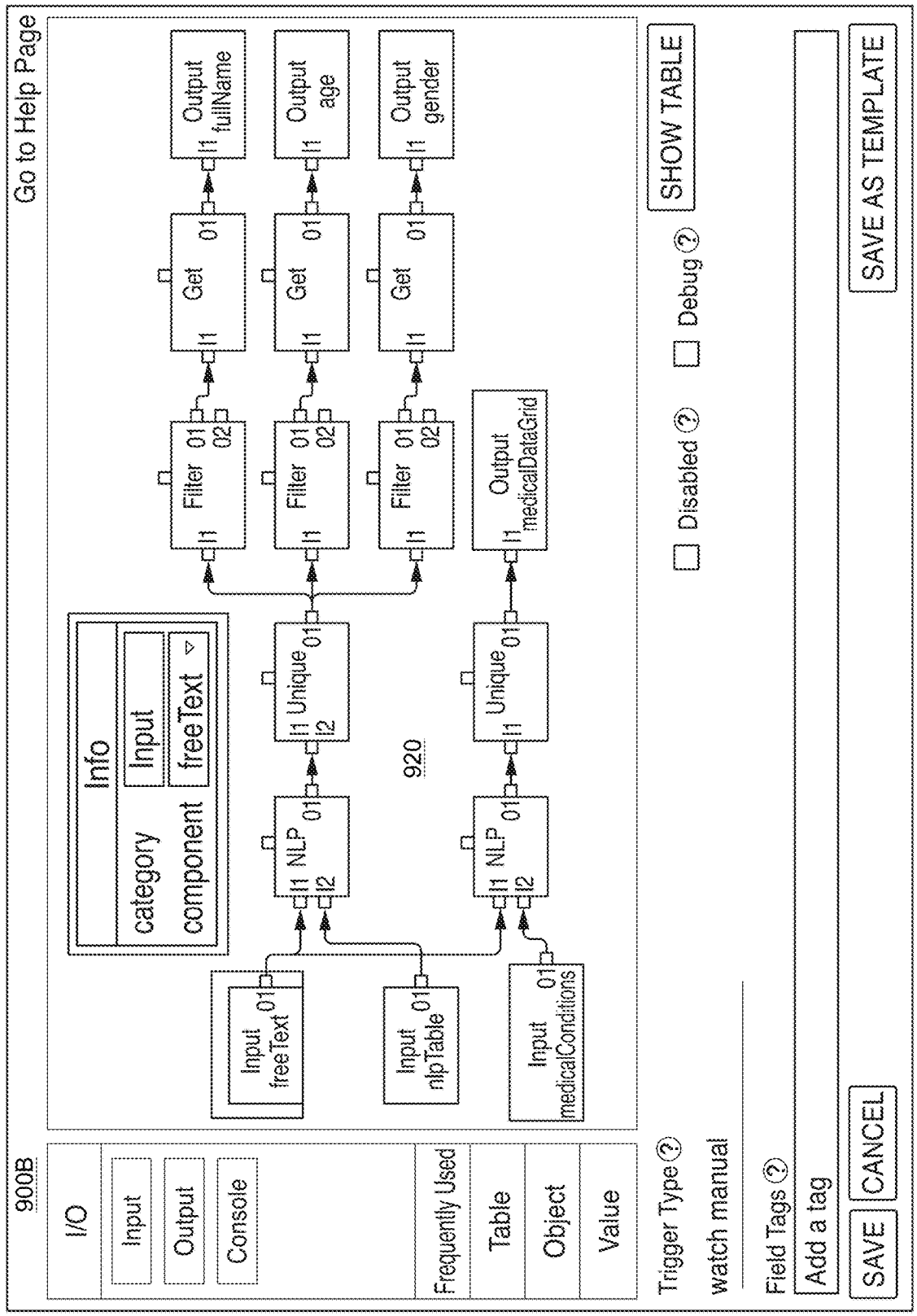
FIG. 9B is another exemplary customization interface for a workflow component in accordance with certain embodiments.

FIGS. 8 and 9A-9B disclose exemplary interfaces that can be provided in connection with certain control components 315. More specifically, FIG. 8 is an exemplary customization interface 800 that can enable a user to customize a decision component in accordance with certain embodiments, and FIGS. 9A-9B are exemplary customization interfaces 900A and 900B that can enable a user to customize for a workflow component in accordance with certain embodiments.

As can be seen in FIGS. 4-8 and 9A-9B, while the interfaces may include similar parameters for customizing the components, the parameters presented on each of the customization interfaces can also vary. Some common customization parameters presented on the interfaces may include:

(1) Label: This may represent the label (e.g., text string) that appears next to the component in the electronic form 155.

(2) Property name: The name of the component (e.g., such as the "name" parameter used in an HTML input element). This name may be used to reference the component via the electronic form 155 and/or the API created for the electronic form 155.

(3) Input Mask: This allows users to ensure input is received in a specific or pre-defined format. For example, the users may specify that inputs received via a component are to be in numeric form, alphabetical form, and/or alphanumeric form.

(4) Prefix: Text that is displayed before a component (e.g., "$" or "@" that is displayed before an input field).

(5) Suffix: Text that is displayed after a component (e.g., ".com").

(6) Protected: A protected field will not be returned when queried via an API.

(7) Persistent: A persistent filed will be stored in a database (e.g., database 240) when the electronic form 155 is submitted by a customer or other user.

(8) Hidden: Indicates that a component or field should be hidden (e.g., such that it is not visible to a customer or other user filling out the form).

(9) Disabled: Indicates that a field or component should be disabled (e.g., such that input cannot be entered).

(10) Required: Indicates that a field or component must be filled in before the electronic form 155 be submitted by a customer or other user.

(11) CSS Class: Allows the user creating and/or modifying the form to associate a custom cascading style sheet (CSS) class with a field or component.

(12) Description: Text that will appear below or near the component or input field (e.g., which describes the component or input field to a customer or user filling out the form).

(13) Trigger: Identifies a component that should be triggered or executed. For example, this may identify a component that uses the input from a field or component to execute a process or perform an operation.

(14) On Keypress: Identifies a component that should be triggered or executed in response to detecting a key press event.

(15) Clear Value When Hidden: Indicates that a value of a field or component should be cleared when the field or component is hidden.

(16) Tooltip: Allows a tooltip (e.g., a message that appears when a cursor is positioned over the field or component) to be associated with a field or component.

(17) Minimum Length: Indicates a minimum number of characters that must be entered into a field or component.

(18) Maximum Length: Indicates a maximum number of characters that must be entered into a field or component.

(19) Field Tags: Allows users to specify one or more tags (e.g., textual labels or names) to be associated with a field or component.

(20) Width: Indicates the width of the component or field (e.g., in pixels, percentage, and/or inches).

(21) Height: Indicates the height of the component or field (e.g., in pixels, percentage, and/or inches).

(22) Background Color: Indicates the background color of the field or component (e.g., using hex codes).

The customization parameters mentioned in this disclosure are intended to be exemplary and are not intended to be an exhaustive listing. It should be understood that other types of customization parameters can also be utilized.

It should also be understood that the customization parameters associated with the application components 313, advanced control components 315, and other similar types of components that enable more complex functionality to be incorporated into the electronic forms 155 can include customization parameters that are specific to implementing such functionality. For example, as shown in FIG. 6, the customization interface 600 for an e-signature component can include customization parameters that allow for customization of signature color. Likewise, as shown in FIG. 7, the customization interface 700 for a data selector component may include customization parameters for specifying a date format (e.g., which allows users to specify a format for displaying the date) and which allows the dates of a calendar to be restricted to certain ranges. Similar types of customization parameters can be presented for the application components 313.

The interface 800 illustrated in FIG. 8 demonstrates the functionality of an exemplary decision component that can be incorporated into an electronic form 155. An input section 810 (labeled "Inputs") of the interface allows the user to identify one or more components that have been added to the electronic form 155. Any components identified in the input section 810 can be monitored in real-time when the electronic form 155 is deployed. For example, in the event that a customer is filling out the electronic form 155, any inputs (e.g., text inputs, click inputs, etc.) received via a component identified in the input section will be detected immediately. Each component that is monitored is listed on a different row of the table for the input section in the "Id" column. The user can select options in the "type" indicating the types of inputs that will trigger the decision component (e.g., whether an "exact" input will trigger the input component or whether an input falling in a specific "range" will trigger the input component). The user can also select options that indicate whether the input is "required" (e.g., which can indicate whether the input is required for validating the form) and/or "silent" (e.g., indicating that the component identified in the input section 810 is triggered by an execute command rather than being monitored for changes).

The output section 820 on the interface 800 (labeled "Outputs") allows the user to identify the components of the electronic form 155 that can be modified by the decision component. For example, the decision component can be used to modify various parameters or aspects of input fields, hidden values, application components layout components, navigation components, etc. Each row corresponds to a specific component identified in the "Id" column. The "type" column identifies the action or operation that should be performed for modifying the components identified in the output section 820. In certain embodiments, the user can select one or more of the following actions:

(1) Value: allows the value of an identified component to be changed;

(2) Message: allows a pop-up message or window associated with the identified component to be output;

(3) Steps: automatically skips ahead to other pages or interfaces of the electronic form which correspond to the identified component and/or which are identified by a navigation component;

(4) Label: changes the label associated an identified component;

(5) Visible: allows the visibility of an identified component to be turned on/off (e.g., by dynamically adding or removing the identified component from the interface displaying the electronic form);

(6) Pop Error: generates an error message on the back-end that notifies an identified component (e.g., which notifies an error handler to take corrective actions);

(7) Navigation: automatically navigates to a different portion of the electronic form corresponding to an identified component; and (8) Focus: automatically focuses attention on an identified component of the electronic form.

The actions described above are intended to be exemplary and are not intended to provide an exhaustive listing of all actions that can be taken. Other types of actions can also be selected and associated with the components identified in the output section 820.

A logic section 830 (labeled "Micro Decision") of the interface 800 enables logic and/or conditions to be specified by the user indicating if and when the actions identified in the output section should be executed in connection with the components identified in the output section 820. The manner in which the logic and/or conditions are specified may vary. For example, in certain embodiments, as components are added to the input section and the output section 830, the table associated with the logic section may automatically be updated to include columns corresponding to the components. Columns may also be added which concatenate the values of the "id" and "type" columns in the output section. The user can then specify values of the components in the input section that will trigger the actions to be taken by the components identified in the output section. Regardless of how the logic section is configured, the logic section 830 enables non-technical users to correlate inputs received from components in the input section 810 to actions and/or changes that are to be implemented for the components identified in the output section 820.

A testing section 840 enables a user to perform testing on the settings specified in the input section 810, output section 820, and logic section 830. For example, the user can hit the execute button near the testing section 840 to view values that would be returned based on the settings in these sections.

The customization interfaces 900A and 900B in FIGS. 9A and 9B demonstrate the functionality of an exemplary workflow component that can be incorporated into an electronic form 155. FIG. 9A shows a blank customization interface 900A for an exemplary workflow component, and FIG. 9B shows a customization interface 900B for an exemplary workflow component that includes a node diagram 920 that has been created by a user. To design the node diagram 920, users can drag-and-drop input nodes, output nodes, and processing nodes from the diagram menu 910 into a diagram development window 930. The users can then specify options for mapping the nodes to one another.

For example, with reference to FIG. 9B, the user has added three input nodes to the diagram 920. The three input nodes may correspond to input field components and/or other components added to the electronic form being created. By adding the input nodes to the diagram, the components corresponding to the input nodes will be monitored in real time as the electronic forms are being filled out. The user has also added a variety of processing nodes, each of which is configured to perform a specific function. For example, processing nodes have been added which include: NLP nodes (e.g., for performing natural language processing operations on the inputs received form the input nodes), filter nodes (e.g., for filtering data from the input nodes and/or upstream processing nodes), nodes for creating a unique table (e.g., for storing and/or organizing data from the input nodes and/or upstream processing nodes), and nodes for performing get operations (e.g., to retrieve data from tables that were created). The settings for each of the processing nodes can be customized by the users (e.g., to define the NLP, filtering table creation, and get operations being performed). The user has also added four output nodes. The four output nodes may correspond to input field components and/or other components added to the electronic form being created. The output nodes will be configured to output data (e.g., to modify filed values) and/or execute actions based on the operations specified in the diagram 920. The diagram 920 displays how the user mapped the nodes to one another to control the flow of information from the input nodes to the output nodes (after passing through various processing nodes).

In the exemplary diagram 920 shown on the interface 900B in FIG. 9B, the workflow component is utilized to design a transcription tool for use by a medical doctor and/or other type of medical practitioner. The three input nodes can correspond to text area fields or other input fields that receive patient information (e.g., which may be input by keyboard and/or transcribed from voice inputs). The NLP nodes may process the inputs received via the input nodes and insert the data into a unique table created by the unique table nodes (labeled "Unique"). Some of the data may be filtered (e.g., by the filtering nodes) to detect information such as gender, age, and name. Get operations can then retrieve data from the tables and provide this data to the output components. The output components can correspond to fields or other features of the electronic form 155 that are updated with information retrieved using the get information. Thus, in this example, a user is able to configure an electronic form that provides a transcription application without any technical knowledge and simply by designing a diagram 920 on a GUI.

The exemplary diagram 920 shown in FIG. 9B is just one example of how the diagram 920 can be utilized to incorporate advanced functionalities into the electronic forms 155. It should be apparent the nodes can be inserted into the diagram in various ways to allow processing of inputs received by components and mapping of outputs to other components. Various form-related applications can be designed using the workflow component.

Also, the aforementioned processing nodes are mentioned as examples of nodes that can be inserted into the diagram 920. Many other types of processing nodes may also be inserted into the diagram including, but not limited to the processing nodes that can be configured to perform operations such as filtering data, selecting data, sorting data, deleting data, mapping data (e.g., mapping data to tables), merging data, appending data, parsing data, and/or other types of operations.

Figure 10:
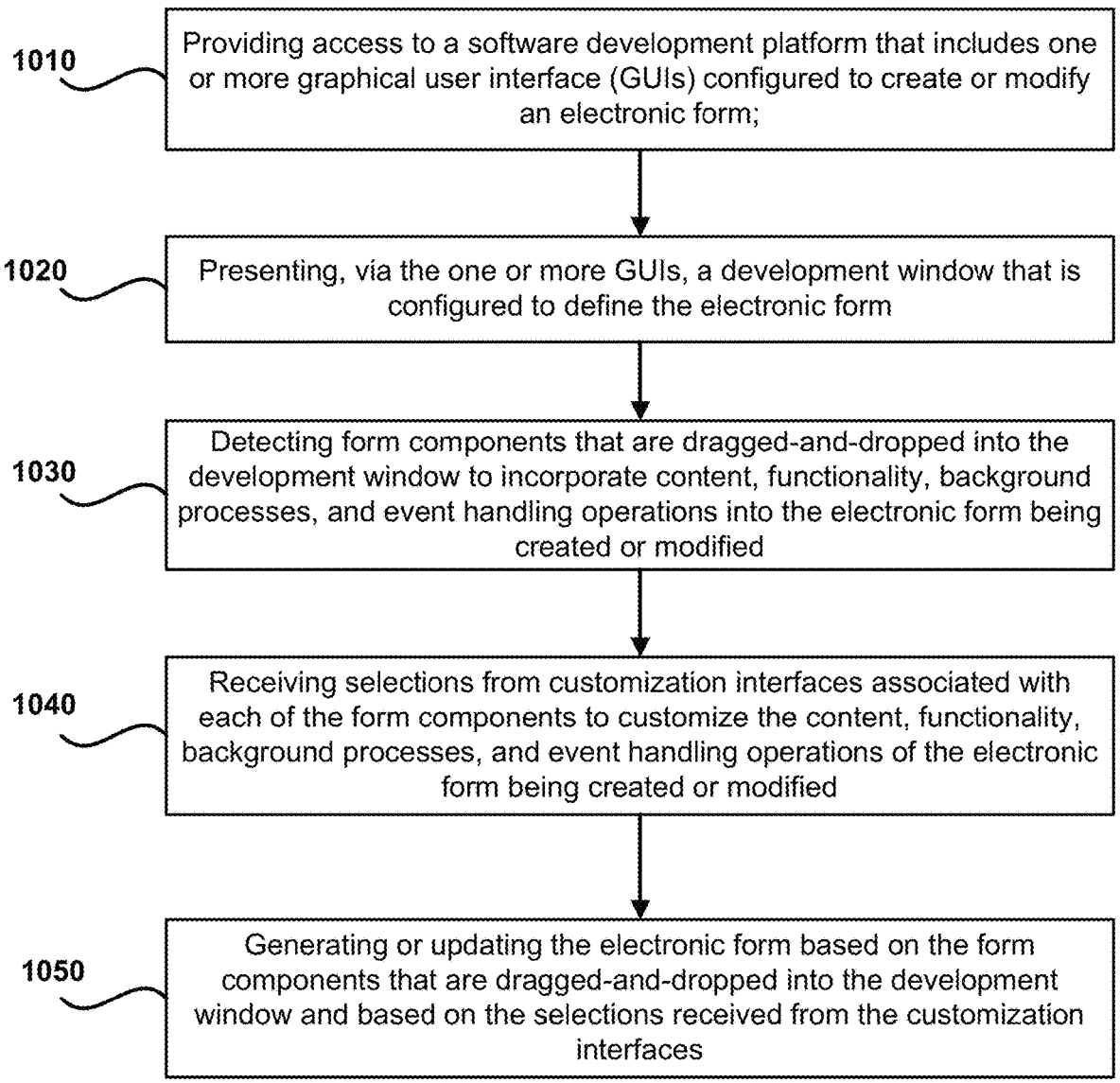
FIG. 10 is a flow chart of an exemplary method for creating an electronic form in accordance with certain embodiments.

FIG. 10 is a flow chart of an exemplary method 1000 for creating an electronic form 155 in accordance with certain embodiments of the present invention. The exemplary method 1000 may be executed in whole or in part by the development and deployment platform 150 (e.g., using the development toolkit 210 and/or form generation interface 300). For example, one or more storage devices 201 can store instructions for performing the steps of method 1000, and one or more processors 202 can be configured to execute performance of the steps of method 1000.

In step 1010, access is provided to a software development platform 150 that includes one or more graphical user interfaces (GUIs) configured to create or modify an electronic form 155. In certain embodiments, a user may access the platform over a network 160 and/or directly via a local device. In certain embodiments, the user may utilize a web browser and/or local application to access the platform. The one or more GUIs may include the form generation interface 300 illustrated in FIG. 3 and/or the customization interfaces illustrated in FIGS. 4-8 and 9A-9B.

In step 1020, a development window 330 that is configured to define the electronic form may be presented via the one or more GUIs. In certain embodiments, the development window 330 may be implemented as a WYSIWYG editor and/or in a WYSIWYG format that enables the user creating and/or modifying an electronic form 155 to see what the electronic form 155 will look like while the electronic form 155 is being created and/or modified.

In step 1030, form components that are dragged-and-dropped into the development window 300 are detected to incorporate content, functionality, background processes, and event handling operations into the electronic form 155 being created or modified. The form components may be displayed on a menu (e.g., component menu 320) and may include layout component 311, input field components 312, application components 313, template components 314, and/or advanced control components 315. The background processes may be defined by the decision component and/or workflow component described above. The background processes may include application and/or sub-routines which run in the background of a browser and/or application when the form is accessed by customers or other users.

In step 1040, selections are received from customization interfaces associated with each of the form components to customize the content, functionality, background processes, and event handling operations of the electronic form being created or modified. As discussed above (e.g., with respect to FIGS. 4-8 and 9A-9B), each of the customization interfaces can present a plurality of customization parameters for customizing the form components.

In step 1050, the electronic form 155 is generated or updated based on the form components that are dragged-and-dropped into the development window and based on the selections received from the customization interfaces.

Figure 11:
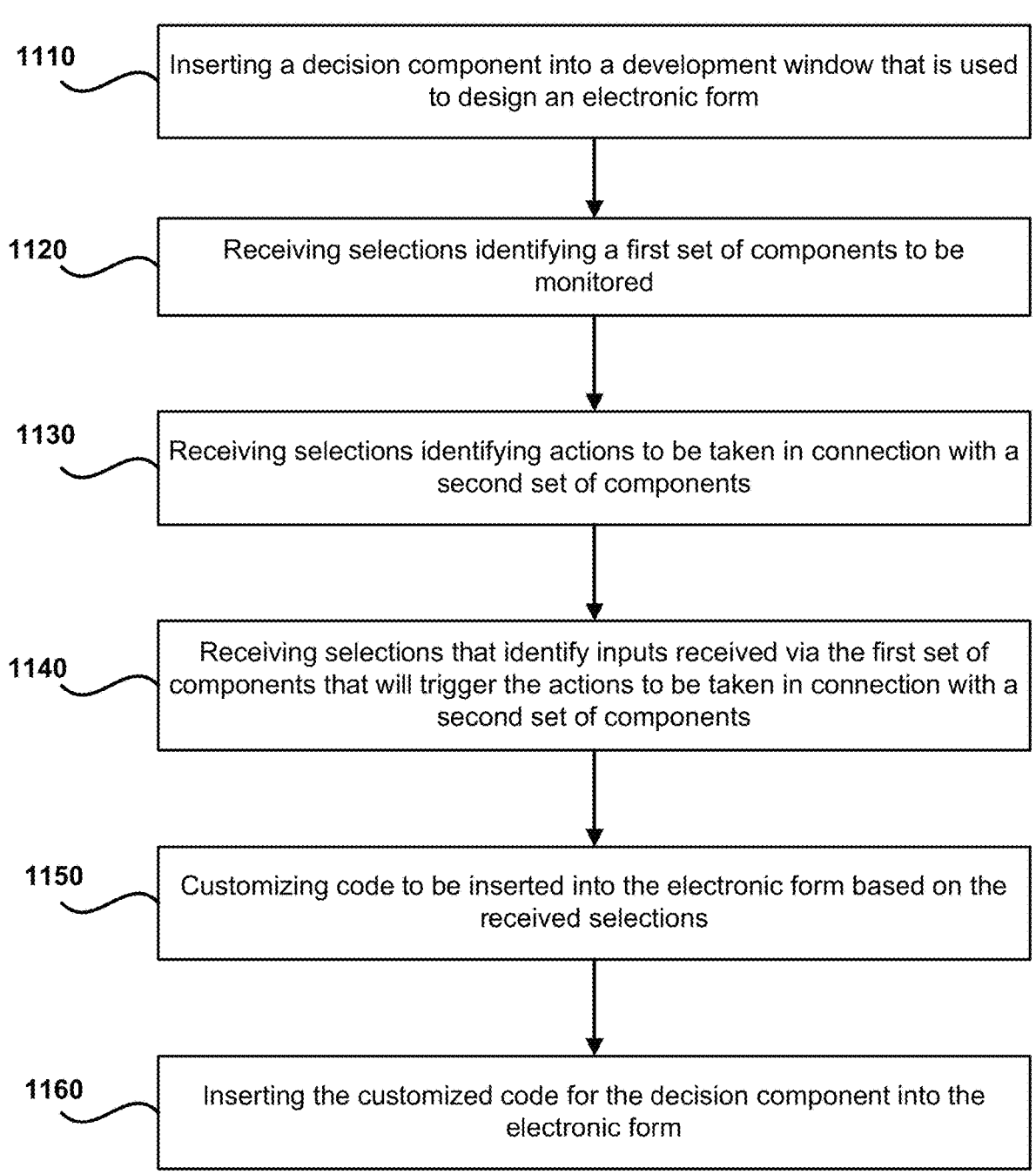
FIG. 11 is a flow chart of an exemplary method for adding a decision component to an electronic form in accordance with certain embodiments.

FIG. 11 is a flow chart of an exemplary method 1100 for adding a decision component to an electronic form in accordance with certain embodiments of the present invention. The exemplary method 1100 may be executed in whole or in part by the development and deployment platform 150 (e.g., using the development toolkit 210 and/or form generation interface 300). For example, one or more storage devices 201 can store instructions for performing the steps of method 1100, and one or more processors 202 can be configured to execute performance of the steps of method 1100.

In step 1110, a decision component is inserted into a development window 330 that is used to design an electronic form 155. In step 1120, selections are received for identifying a first set of components to be monitored. For example, as mentioned above, a customization interface associated with a decision component may include an input section 810 for identifying form components (e.g., input field components 312, application components 313, etc.) to be monitored. In step 1130, selections are received for identifying actions to be taken in connection with a second set of components. For example, the customization interface associated with a decision component can include an output section 320 that identifies components that should be modified and/or actions to be taken in connection with such components. In step 1140, selections are received that identify inputs received via the first set of components that will trigger the actions to be taken in connection with a second set of components. The selections may be received via the logic section 830 of the customization interface for the decision component. In step 1150, code (e.g., programming code, logic and/or computing instructions) to be inserted into the electronic form 155 is customized based on the received selections (including the selections received in steps 1120, 1130 and 1140). In step 1160, the customized code for the decision component is inserted into the electronic form 155.

While various novel features of the invention have been shown, described, and pointed out as applied to particular embodiments thereof, it should be understood that various omissions and substitutions and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding therefrom of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

What is claimed is:

1. A system comprising:
   one or more computing devices comprising one or more processors and one or more non-transitory storage devices for storing instructions, wherein execution of the instructions by the one or more processors causes the one or more computing devices to:
   provide access to a software development platform that includes one or more graphical user interfaces (GUIs) configured to create or modify an electronic form;
   present, via the one or more GUIs, a development window that is configured to define the electronic form;
   detect form components that are dragged-and-dropped into the development window, the dragged-and-dropped form components comprising drag-and drop content components to incorporate visible content into the electronic form being created or modified, and one or more drag-and-drop control components that cause automatic display of control customization interfaces to receive customization input for configuring non-visible functionality, background processes, and event handling operations for the electronic form being created or modified to control, at least in part, the visible content incorporated by the drag-and-drop content components, wherein at least one of the one or more drag-and-drop control components defines action to be taken by a first of the drag-and-drop form components in response to detecting inputs or events for a second of the drag-and-drop form components different from the first of the drag-and-drop form components;
   receive, from customization interfaces associated with the form components, selections to customize parameters for each of the form components added to the electronic form being created or modified, including to receive from at least one of the control customization interfaces, invoked in response to a detected drag-and-drop control component, control interface selections made in a first area of the at least one control customization interface to define the action to be taken by the first drag-and-drop content component in response to the inputs or events, specified in a second area of the control customization window, occurring in the second drag-and-drop content component;
   generate or update the electronic form based on the form components that are dragged-and-dropped into the development window and based on the selections received from the customization interfaces, wherein the electronic form comprises rules, parameters, and other features;

configure the non-visible functionality, the background processes, and the event handling operations for the electronic form based, in part, on the control interface selections received from the at least one control customization interface invoked in response to a detected drag-and-drop control component, including to configure the action to be taken for the first drag-and-drop content component in response to the detected inputs or events for the second drag-and-drop content component;

perform an analysis by a machine learning component, implemented by the one or more computing devices, using the rules, parameters, and other features relating to the electronic form and any data collected by the electronic form, wherein the analysis further identifies recommendations and statistical data related to the analysis; and automatically modify portions of the electronic form using the recommendations identified by the rules, parameters, and other features relating to the electronic form and the any data collected by the electronic form.

2. The system of claim 1, wherein the one or more control components at least include a decision component that enables code to be inserted into the electronic form for defining the background processes, and wherein the background processes enable the electronic form to be dynamically updated in real-time based on inputs received via the electronic form.

3. The system of claim 2, wherein a customization interface associated with the decision component includes:
an input section that is configured to receive selections for identifying a first set of form components to be monitored in real-time when the electronic form is deployed;
an output section that is configured to receive selections for one or more actions to be executed in connection with a second set of form components; and
a logic section that specifies conditions under which the one or more actions are executed in connection with the second set of form components based on inputs received via the first set of form components.

4. The system of claim 3, wherein the one or more actions include one or more of the following:
modifying field values associated with the second set of form components;
modifying visibility parameters associated with the second set of form components;
outputting one or more messages to user who is filling out the electronic form;
generating one or more error messages; and
automatically navigating to a different section or page of the electronic form.

5. The system of claim 1, wherein generating or updating the electronic form includes generating or updating an application programming interface (API) corresponding to the electronic form.

6. The system of claim 1, wherein the one or more control components include a workflow component that enables a customized background process for the electronic form to be defined using a node diagram.

7. The system of claim 6, wherein the node diagram is defined using:
one or more input nodes that identify one or more of the form components that are to be monitored in real-time;
one or more processing nodes that are configured to receive data from the input nodes and to perform one or more functions associated with manipulating the data; and
one or more output nodes that identify one or more of the form components that are configured to output the data processed by the one or more processing nodes.

8. The system of claim 7, wherein the node diagram is created using a customization interface associated with the workflow component which allows the one or more input nodes, the one or more processing nodes, and the one or more output nodes to be dragged-and-dropped into a window for creating the node diagram.

9. The system of claim 1, wherein execution of the instructions by the one or more processors causes the one or more computing devices to:
deploy the electronic form to enable users to fill out the form;
collect data via the electronic form; and
aggregate the collected data in a database.

10. The system of claim 9, wherein the aggregated data is analyzed using a machine learning algorithm to identify one or more form components or one or more rules associated with the electronic form that can be modified based on a specific objective.

11. The system of claim 1, wherein the at least one of the one or more drag-and-drop control components comprises a decision component identifying one or more operations performed on one or more first data fields of a first content component in response to resultant processing performed by a logic section implementing decision logic for the decision component, on data in one or more second data fields of a second content component different from the first content component.

12. The system of claim 1, wherein the at least one of the one or more drag-and-drop control components comprises a workflow component identifying one or more operations performed on one or more first data fields of a first content component using resultant data produced by a logic section implementing workflow logic for the workflow component, and applied to data in one or more second data fields of a second content component different from the first content component.

13. The system of claim 1, wherein the at least one of the one or more drag-and-drop control components comprises a drag-and-drop decision component that invokes a decision customization window to specify by a user, in an output selection area of the decision customization window, actions to be performed by the first drag-and-drop content component based on inputs, identified by the user in an input selection area of the decision customization window, of the second drag-and-drop content component, wherein the decision customization window further includes a logic section to identify if and when the actions specified in the output selection area should be executed in connection with the input identified in the input selection area of the decision customization window.

14. The system of claim 1, wherein the at least one of the one or more drag-and-drop control components comprises a workflow component that invokes a workflow customization window to create, by a user, a node flow diagram comprising selected input nodes interconnected to selected output nodes via selected processing nodes performing actions on the selected input nodes.

15. A method comprising:
   providing access to a software development platform that includes one or more graphical user interfaces (GUIs) configured to create or modify an electronic form;
   presenting, via the one or more GUIs, a development window that is configured to define the electronic form;
   detecting form components that are dragged-and-dropped into the development window, the dragged-and-dropped form components comprising drag-and drop content components to incorporate visible content into the electronic form being created or modified, and one or more drag-and-drop control components that cause automatic display of control customization interfaces to receive customization input for configuring non-visible functionality, background processes, and event handling operations for the electronic form being created or modified to control, at least in part, the visible content incorporated by the drag-and-drop content components, wherein at least one of the one or more drag-and-drop control components defines action to be taken by a first of the drag-and-drop form components in response to detecting inputs or events for a second of the drag-and-drop form components different from the first of the form components;
   receiving, from customization interfaces associated with the form components, selections to customize parameters for each of the form components added to the electronic form being created or modified, including receiving from at least one of the control customization interfaces, invoked in response to a detected drag-and-drop control component, control interface selections made in a first area of the at least one control customization interface to define the action to be taken by the first drag-and-drop content component in response to the inputs or events, specified in a second area of the control customization window, occurring in the second drag-and-drop content component;
   generating or updating the electronic form based on the form components that are dragged-and-dropped into the development window and based on the selections received from the customization interfaces, wherein the electronic form comprises rules, parameters, and other features;
   configuring the non-visible functionality, the background processes, and the event handling operations for the electronic form based, in part, on the control interface selections received from the at least one control customization interface invoked in response to a detected drag-and-drop control component, including configuring the action to be taken for the first drag-and-drop content component in response to the detected inputs or events for the second drag-and-drop content component;
   performing an analysis by a machine learning component, implemented by one or more computing devices, using the rules, parameters, and other features relating to the electronic form and any data collected by the electronic form, wherein the analysis further identifies recommendations and statistical data related to the analysis; and
   automatically modifying portions of the electronic form using the recommendations identified by the rules, parameters, and other features relating to the electronic form and the any data collected by the electronic form.

16. The method of claim 15, wherein the one or more control components at least include a decision component that enables code to be inserted into the electronic form for defining the background processes, and wherein the background processes enable the electronic form to be dynamically updated in real-time based on inputs received via the electronic form.

17. The method of claim 16, wherein a customization interface associated with the decision component includes:
   an input section that is configured to receive selections for identifying a first set of form components to be monitored in real-time when the electronic form is deployed;
   an output section that is configured to receive selections for one or more actions to be executed in connection with a second set of form components; and
   a logic section that specifies conditions under which the one or more actions are executed in connection with the second set of form components based on inputs received via the first set of form components.

18. The method of claim 17, wherein the one or more actions include one or more of the following:
   modifying field values associated with the second set of form components;
   modifying visibility parameters associated with the second set of form components;
   outputting one or more messages to user who is filling out the electronic form;
   generating one or more error messages; and
   automatically navigating to a different section or page of the electronic form.

19. The method of claim 15, wherein generating or updating the electronic form includes generating or updating an application programming interface (API) corresponding to the electronic form.

20. The method of claim 15, wherein the one or more control components include a workflow component that enables a customized background process for the electronic form to be defined using a node diagram.

21. The method of claim 20, wherein the node diagram is defined using:
   one or more input nodes that identify one or more of the form components that are to be monitored in real-time;
   one or more processing nodes that are configured to receive data from the input nodes and to perform one or more functions associated with manipulating the data; and
   one or more output nodes that identify one or more of the form components that are configured to output the data processed by the one or more processing nodes.

22. The method of claim 21, wherein the node diagram is created using a customization interface associated with the workflow component which allows the one or more input nodes, the one or more processing nodes, and the one or more output nodes to be dragged-and-dropped into a window for creating the node diagram.

23. The method of claim 15, furthering comprising:
   deploying the electronic form to enable users to fill out the form; collecting data via the electronic form; and
   aggregating the collected data in a database.

24. The method of claim 23, wherein the aggregated data is analyzed using a machine learning algorithm to identify one or more form components or one or more rules associated with the electronic form that can be modified based on a specific objective.

* * * * *